Figures 1, 2:
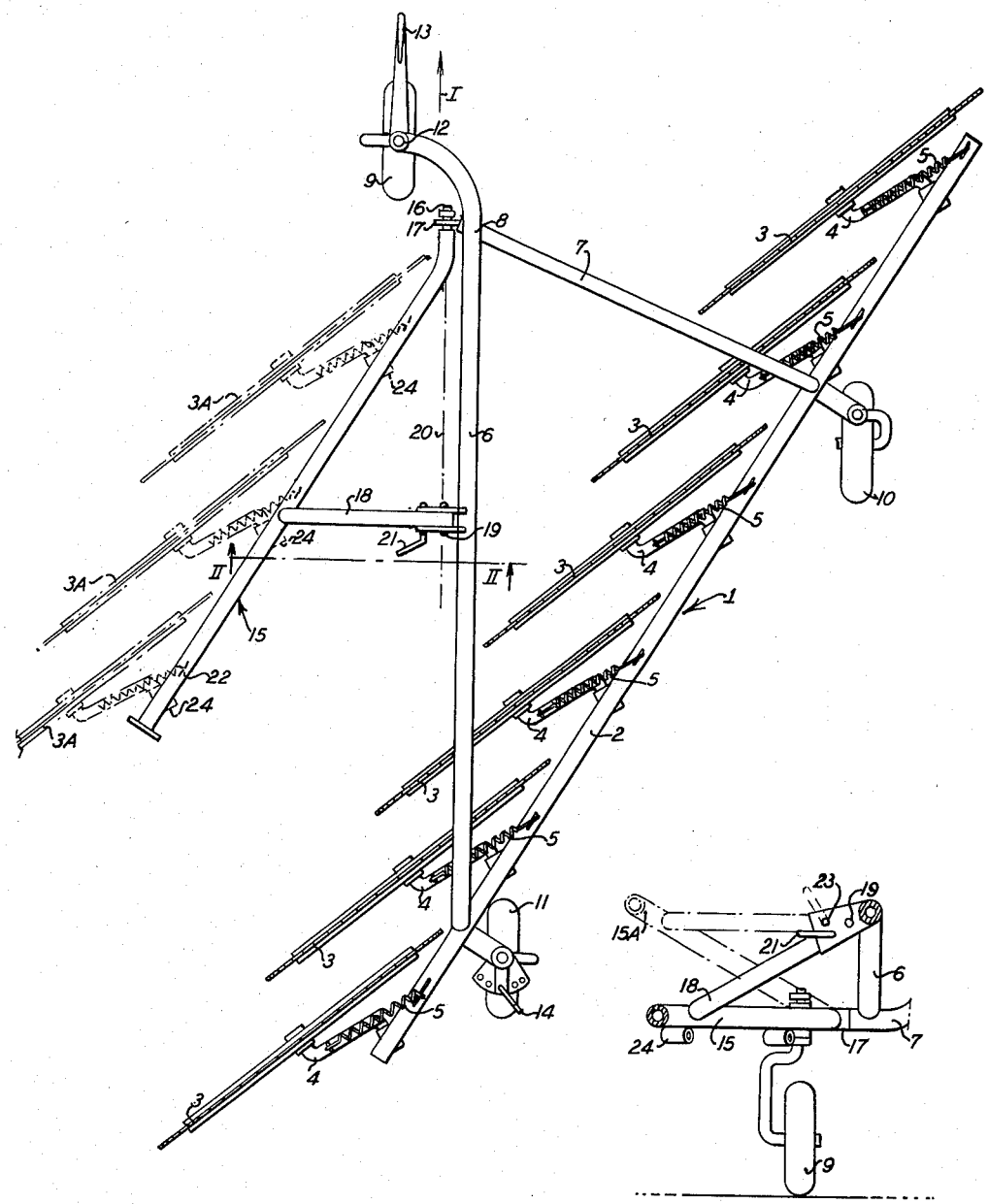

Oct. 11, 1960  C. VAN DER LELY ET AL  2,955,407
SIDE DELIVERY RAKING DEVICE
Filed Nov. 14, 1957

INVENTORS
CORNELIS VAN DER LELY
ARY VAN DER LELY

United States Patent Office 2,955,407
Patented Oct. 11, 1960

2,955,407

SIDE DELIVERY RAKING DEVICE

Cornelis van der Lely and Ary van der Lely, Maasland, Netherlands, assignors to C. van der Lely N.V., Maasland, Netherlands, a Dutch company Filed Nov. 14, 1957, Ser. No. 696,472

Claims priority, application Netherlands Nov. 30, 1956

7 Claims. (Cl. 56—377)

This invention relates to devices of the type employed for laterally displacing crop lying on the ground and of the kind having a frame with a plurality of rake wheels which lie in one row and which are rotatably arranged on a frame beam.

In known devices of this kind, an additional auxiliary support is sometimes provided at the rear of the frame in order to convert the device, for example, from a side delivery rake to a swath turner. On this auxiliary support, some of the rake wheels are arranged.

The forces exerted during operation on the rake wheels arranged on the auxiliary support are transferred via the frame to the front side of the device, since the propelling force for the device is usually applied to the said side. Therefore, the frame must be heavier than in the absence of an additional auxiliary support.

An object of the invention is to provide a possibility of arranging an additional auxiliary support on a main frame in such a manner that the main frame need not be heavier than without the use of this additional auxiliary support.

In accordance with the invention, this is achieved by providing the frame near its front end with fastening means for an additional auxiliary support on which a few of the rake wheels can be arranged.

A particularly advantageous embodiment of the invention is obtained by arranging the auxiliary support on that side of the row of rake wheels which is in contact with the crop. However, under certain conditions a high swath may be formed during operation on that side of the row of rake wheels which is in contact with the crop, so that the auxiliary support might prevent the crop lying in front of the rake wheels from being smoothly conducted away. In the case of a side delivery rake, it is thus best to construct the fastening means so that at least part of the auxiliary support can be displaced.

The invention will be described more fully with reference to the accompanying drawing, which shows one advantageous embodiment of the invention and in which:

Fig. 1 is a plan view of a raking implement provided in accordance with the invention, and Fig. 2 is an elevational view of part of the raking implement, taken on line II—II of Figure 1.

In the drawing is shown a device for laterally displacing crop lying on the ground which comprises a frame 1 provided with a longitudinal beam 2 to which rake wheels 3 are secured in a row by means of cranks 4. The weight of the rake wheels is transferred at least in part to the longitudinal beam 2 by means of springs 5. The frame 1 is furthermore provided with the frame beams 6 and 7 which extend from the longitudinal beam 2 over the rake wheels to the front side of the rake wheels where they are connected to each other at 8. The frame is supported by three running wheels 9, 10 and 11, each of which is rotatable about a vertical shaft. To the vertical shaft 12 of the running wheel 9 is rigidly secured a draw hook 13 by which the side delivery rake can be pulled. Owing to the fastening of the draw hook 13 to the shaft 12, the running wheel 9 constitutes a steering wheel. The running wheel 10 is a caster wheel and the running wheel 11, which can be fixed in different positions with respect to the frame 1 by means of a locking pin 14, determines the direction.

The frame 1 is provided with an additional auxiliary support or frame 15 which is connected to frame 1 by fastening means consisting of a pin 16 provided at the front end of the auxiliary support 15 and a plate 17 provided near the front end of the device and having a hole for the pin 16. This provides a pivotal joint between the frame and the auxiliary support. To the auxiliary support 15 is secured a strut 18 which is connected at its free end, adjacent to but rearwardly of the front end of the device, by means of a pin 19 to the beam 6. The line of connection between the pivotal joint formed by the pin 16 and that formed by the pin 19 constitutes a pivot axis 20 for the auxiliary support 15 which is not supported by a running wheel. This axis extends along the direction of travel, as viewed from above; i.e., it is a longitudinal axis parallel to the normal direction of travel of the device. The pivotal joint formed by the pin 19 is at a higher level than the pivotal joint formed by the pin 16, since the frame beam 6 extends over the rake wheels and is directed downwards to the front. This provides the advantage that the pivotal axis 20 is inclined to the horizontal and lies at a higher level than at least part of the auxiliary support 15, so that the latter is displaced both in a horizontal and a vertical direction during a rotation about the pivot axis. By means of a locking pin 21 the auxiliary support 15 is fixed in place with respect to the frame. When all rake wheels are located in one row, as is shown in Fig. 1, the crop will engage the rake wheels on the forward side of the row of rake wheels during travel in the direction I and the crop may accumulate to a great height in front of the hindmost rake wheels. In order to prevent the auxiliary support 15, which also lies on the side III of the rake wheels, from engaging the crop in the said position, the auxiliary support can be turned about the pivotal axis 20, after the locking pin 21 has been removed, to the position 15a, shown in Fig. 2 in broken lines; then the auxiliary support 15 can be fixed in place with respect to the frame by introducing the locking pin 21 into the hole 23. Owing to the oblique position of the pivotal axis 20, only that part of the auxiliary support which is adapted to engage the crop need be displaced with respect to the frame, whereas the part of the auxiliary support which cannot touch the crop remains substantially in place and may turn only about its own axis, so that the power required for the displacement of those parts of the auxiliary support which may be stationary is minimized.

The side delivery rake may be converted into a swath turner by fixing the auxiliary support 15 in the non-tilted position, as is indicated by full lines in Figure 2 and by arranging some of the rake wheels 3 on the auxiliary support 15 in the bearings 24, as is indicated in position 3A, shown in broken lines. In this position the device will move aside the crop in two swaths. When the device travels in this position, the forces exerted by the resistance of the rake wheels on the auxiliary support will be transferred only partially via the frame beam 6 to the draw arm 13, owing to the positions of the points of connection of the auxiliary support near the front end of the device, so that the frame need not be heavier than in the absence of an auxiliary support.

What we claim is:

1. A device for laterally displacing material lying on the ground and having a determinable direction of travel, said device comprising spaced and parallel rows of rake wheels, a frame operatively associated with and supporting one of said rows of rake wheels, an auxiliary frame operatively associated with and supporting the other of said rows of rake wheels, and means operatively associated with and connecting the frames along a generally longitudinally disposed pivot axis inclined to the horizontal.

2. A device as claimed in claim 1 comprising locking means operatively associated with the frames for locking the same in fixed relative positions.

3. A device as claimed in claim 1 comprising pins spaced on one of the frames and defining said pivot axis, said pins being operatively associated with and supporting the other of the frames.

4. A device as claimed in claim 1 wherein said axis is parallel to said direction of travel.

5. A device as claimed in claim 3 wherein one pin is located at a higher level than the other.

6. A device as claimed in claim 4 wherein the rows and axis are angularly disposed with respect to each other.

7. A device as claimed in claim 1 comprising running wheels on one of the frames exclusively.

References Cited in the file of this patent

FOREIGN PATENTS

| | | |
|---|---|---|
| 73,684 | Denmark | Jan. 7, 1952 |
| 1,104,448 | France | June 15, 1955 |